United States Patent [19]

Makino et al.

[11] Patent Number: 4,576,099
[45] Date of Patent: Mar. 18, 1986

[54] PALLET TRANSPORT APPARATUS

[76] Inventors: Hiroshi Makino, No. 1013, Haguro-cho, Koufu, Yamanashi, Japan, 400; Shigeyuki Shinohara, 9-7-303, Shimouma 6-chome, Setagaya-ku, Tokyo, Japan, 154

[21] Appl. No.: 637,538

[22] Filed: Aug. 3, 1984

[30] Foreign Application Priority Data

Aug. 5, 1983 [JP] Japan .................................. 58-143393

[51] Int. Cl.⁴ ...................... B61C 11/04; B60L 11/14; F16H 27/00
[52] U.S. Cl. .................................. 104/287; 74/84 R; 74/436; 105/29 R; 105/32
[58] Field of Search ...................... 74/84 R, 436, 820; 104/165, 287; 105/29 R, 32, 49

[56] References Cited

U.S. PATENT DOCUMENTS

| | | | |
|---|---|---|---|
| 2,789,683 | 4/1957 | Stahl | 74/84 R X |
| 2,961,879 | 11/1960 | Hudson | 74/84 R |
| 3,170,333 | 2/1965 | Umbricht | 74/84 R |
| 3,226,027 | 12/1965 | Cable et al. | 105/29 R X |
| 4,109,548 | 8/1978 | Shinohara et al. | 74/84 R X |
| 4,416,165 | 11/1983 | Kramer et al. | 74/436 X |

FOREIGN PATENT DOCUMENTS

| | | | |
|---|---|---|---|
| 528053 | 7/1928 | Fed. Rep. of Germany | 105/29 R |
| 1557542 | 12/1979 | United Kingdom . | |

Primary Examiner—Robert B. Reeves
Assistant Examiner—David F. Hubbuch
Attorney, Agent, or Firm—Wenderoth, Lind & Ponack

[57] ABSTRACT

A pallet transport apparatus includes individual pallets which travel in succession on a run way, each of the pallets containing an in-line indexing dual-cam mechanism and a drive motor for the cam mechanism for controlled rotation, and the run way including pairs of cam followers which are arranged at regular intervals along the run way and each of which engages the corresponding cam plates on a pallet facing it. The pallets can travel and remain motionless every one pitch as determined by the interval between the adjacent cam follower pairs.

6 Claims, 8 Drawing Figures

PALLET TRANSPORT APPARATUS

BACKGROUND OF THE INVENTION

1. Field of the Invention

The present invention relates to a pallet transport system, and more particularly to a cam-controlled pallet transport apparatus that comprises individual pallets traveling in succession on a run way, each of the pallets containing a drive motor and an in-line indexing dual-plate cam mechanism rotatably fixed to the drive motor shaft, and the run way including pairs of cam followers which are arranged at regular intervals along the run way and each of which engages the corresponding plate cams on a pallet facing it. The cooperating action of the dual-cam assembly and the cam followers facing it causes the pallet to advance and then remain motionless for a certain amount of time as determined by the profile of the dual plate cams. The advance and stop operations for the pallet are repeated so that each succeeding pallet can travel on the run way in an orderly fashion without interfering with each other.

2. Description of the Prior Art

Conventional trolley (or carrier) transport employs a self-drive system in which each of individual trolleys contains its own drive motor, which engages a toothed gear, wheel or chain wheel on the trolley. The toothed gear, for example, is driven by the motor for rotation, causing the trolley to travel on a run way. In that self-driven trolley transport system, it is known that the traveling speed of the trolley is slow because of its gear meshing mechanism and the precision with which the trolley is to be stopped in position is low. For practical purposes, therefore, the application of the prior art transport system is only restricted to those installations where the precision requirements or tolerances for stopping the trolley in position are relatively generous, such as in the range of several millimeters (mm).

For transporting pallets on the automatic assembly machine or transfer machine, which requires the highest precision in moving and stopping pallets in position, each of the pallets contains an indexing device, all of which are driven by means of a single motor installed on the base machine. Then, each of the indexing devices on the pallets engages a transfer bar and chain, which is driven intermittently by the indexing device to cause the pallet to travel on a usually straight-line run way (British Pat. No. 1557542).

In another conventional pallet transport which is known as a free-flow transport system, pallets are carried by a chain, roller conveyer, or belt conveyor, traveling toward a stop position on a run way. At the stop position, each pallet is forced to abut against a stopper in order to bring it to rest. Therefore, the pallet must have a physical impact against the stopper when it is being stopped. This type of pallet transport system cannot accomplish high precision, therefore.

SUMMARY OF THE INVENTION

A principal object of the present invention is to provide a pallet transport system that solves the problems mentioned in the preceding section.

Another object of the present invention is, therefore, to provide a high-speed indexing pallet transport apparatus.

Still another object of the present invention is to provide a high-precision pallet transport construction that provides a stop control function for allowing a pallet to be stopped in position with high precision.

A further object of the present invention is to provide a noise-free pallet transport apparatus that controls the traveling and stopping of the pallets without having any accompanying noises that could otherwise occur when the pallets are traveling or they are to be stopped.

In the pallet transport apparatus specifically designed to provide the functions listed above, each of the individual pallet constructions contains an in-line indexing motion dual-cam assembly composed of a combination of two plate cams and a drive motor for controlling the rotation of the cam assembly. Those pallets are travelably mounted in succession along a run way, whose traveling and stopping operations are controlled by pairs of cam followers which are arranged at equally spaced intervals along the run way and engage the corresponding cam plates in the pallet.

According to the pallet transport system whose construction has briefly been described above, each of the pallets is controlled by its own cam assembly which cooperates with the cam followers on the run way. During a full turn of the cam assembly which is driven by its drive motor, the pallet can travel and then can be stopped in position. The traveling and stopping operations of a pallet are determined by the profiles of the two plate cams, and are repeated during each revolution of the cam assembly. That is, the traveling operation of the pallet is controlled by the motion characteristics following the curve diagram of the cam assembly, so that the pallet can travel the high speed and silently. The pallet also can remain at rest or motionless during the dwell period of the cam assembly. This is accomplished by the combined action of the cam assembly and corresponding cam followers which face it. That is, during the dwell period, the cam assembly is held by the corresponding cam followers from revolution so that the pallet can remain motionless. In the above described arrangement, the pallet can be stopped in position with a very high precision, which is usually equal to less than ±0.05 mm.

BRIEF DESCRIPTION OF THE DRAWINGS

The above and other objects and advantages of the present invention will become apparent from the description of several preferred embodiments that follows hereinafter with reference to the accompanying drawings, in which.

DESCRIPTION OF PREFERRED EMBODIMENTS

Figure 1:
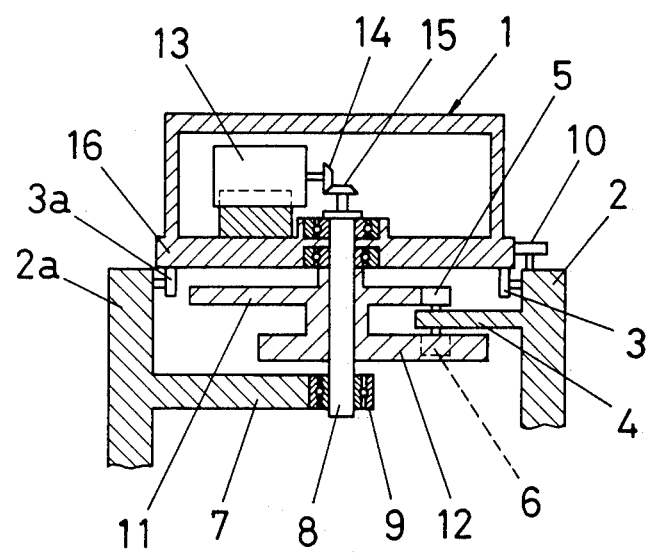
FIG. 1 is a section view illustrating the internal arrangement of one of the pallets, for example, and a run way structure along which the pallets travel.

Referring first to FIG. 1, a pallet run way arrangement on which pallets 1,1 travel includes two parallel frames 2 and 2a which run longitudinally of the run way with a spaced relationship. As shown in FIG. 1, each of the frames 2 and 2a has a roller which is referred to as 3 for the right-side frame 2 and is referred to as 3a for the left-side frame 2a in FIG. 1, the rollers 3 and 3a supporting a pallet to travel on them. The rollers 3 and 3a are located on the upper inner sides of the corresponding frames 2 and 2a, and are rotatably supported by the respective horizontal shafts mounted to the inner sides of the frames. Rollers on each side are arranged at equally spaced intervals in the longitudinal direction of the run way. The frame 2 has a horizontally disposed member 4 inside, which has a width extending transversely and a length extending longitudinally of the frame 2. The member 4 carries cam followers 5 and 6 rotatably supported by their respective vertical shafts. More specifically, cam followers which engage the upper cam are mounted on the upper side of the member 4, and the other cam followers which engage the lower cam are mounted on the lower side. All such cam followers are arranged at equally spaced relations along the length of the member 4. The spacing between every second cam followers is equal to one pitch followed by the corresponding revolving cam plates. The interval between the upper and lower cam followers in any given pair is equal to half the pitch.

The frame 2a has a horizontally disposed member 7 of a width extending inwardly and of a length extending along the length of the frame 2a. The inner longitudinal side of the member 7 serves as a guide to accommodate a roller 9 rigidly mounted to the cam drive shaft 8. The roller 9 of the drive shaft 8 engages the inner longitudinal side of the member 7, and is moved rollingly along the longitudinal side of the member 7. For a practical use, the member 7 may be made of a metal rail, for example, which provides a smoothly surfaced high-precision guide for the drive shaft roller 9.

The frame 2 includes guide rollers 10 which are rotatably mounted to the top surface of the frame 2, and are arranged at equally spaced relation along the length of the frame 2. The rollers 10 serve as guides for a pallet 1, which is supported on one side by the rollers 10 when the pallet is moving or remains at rest under the control of its cam plates acting upon the cam followers.

Next, the construction of the pallet 1 is described. There are a number of pallets, whose number is arbitrary, traveling in succession on the run way. All pallets have an identical construction, and the following description concerning one pallet applies to the remaining pallets. A pallet 1 is usually made of a hollow box, which has a bottom plate 16 resting on the rollers 3 and 3a. A central upright drive shaft 8 is passed through the center of the bottom plate 16, extending toward the location of the free side of the member 7. As shown, the drive shaft 8 is rotatably supported by a bearing mounted to the bottom plate 16. The drive shaft 8 also carries two cam plates 11 and 12, which are rigidly secured to the middle position of the shaft with a parallely spaced relationship with respect to each other. The specific construction of those cam plates will be described later. The drive shaft 8 has a guide roller 9 rigidly secured to the bottom end thereof so that it can rotate with the drive shaft. As described earlier, the guide roller 9 slidably engages the member 7 of the frame 2a. A horizontally disposed drive motor 13 is mounted on the bottom plate 16 within the pallet. A horizontal shaft extending from the drive motor 13 carries a bevel gear 14 at the opposite end thereof, which is in mesh with the counterpart bevel gear 15 rigidly secured at the top end of the drive shaft. In the above described embodiment shown in FIG. 1, the rollers 3 and 3a are provided on each of the frames 2 and 2a, respectively, to support the pallet, which may be replaced by two parallel rails which extend longitudinally along the frames or run way. When the rails are used, each of the pallets may be provided with guide rolls below the bottom plate 16, which can rollingly travel on the rails. Alternatively, such guide rolls may be omitted. In this case, each of the pallets can have a sliding movement on the rails by making a direct contact with the rails without the intervening guide rolls.

The construction of the embodiment shown in FIG. 1 has been illustrated, and its operation is now described. As described by referring to FIG. 1, a pallet is supported by the rollers 3 and 3a on the frames 2 and 2a, and is prevented by means of the cam followers 5 and 6 and the roller 9 at the bottom end of the drive shaft 8 from being displaced sideway, that is in the direction perpendicular to the traveling direction (as indicated by an arrow 18) of the pallet. Also, the pallet is prevented by means of the guide rollers 10 from its axial rotation. Thus, the pallet can reliably travel in its constant posture along the run way. When the drive motor 13 is started up, its driving power is imparted through the engaging bevel gears 14 and 15 to the drive shaft 8. The start-up operation of the motor for all pallets is electrically controlled by the appropriate external control (not shown). The rotation of the drive shaft that is thus driven causes the cam plates 11 and 12 to rotate therewith.

Figure 2:
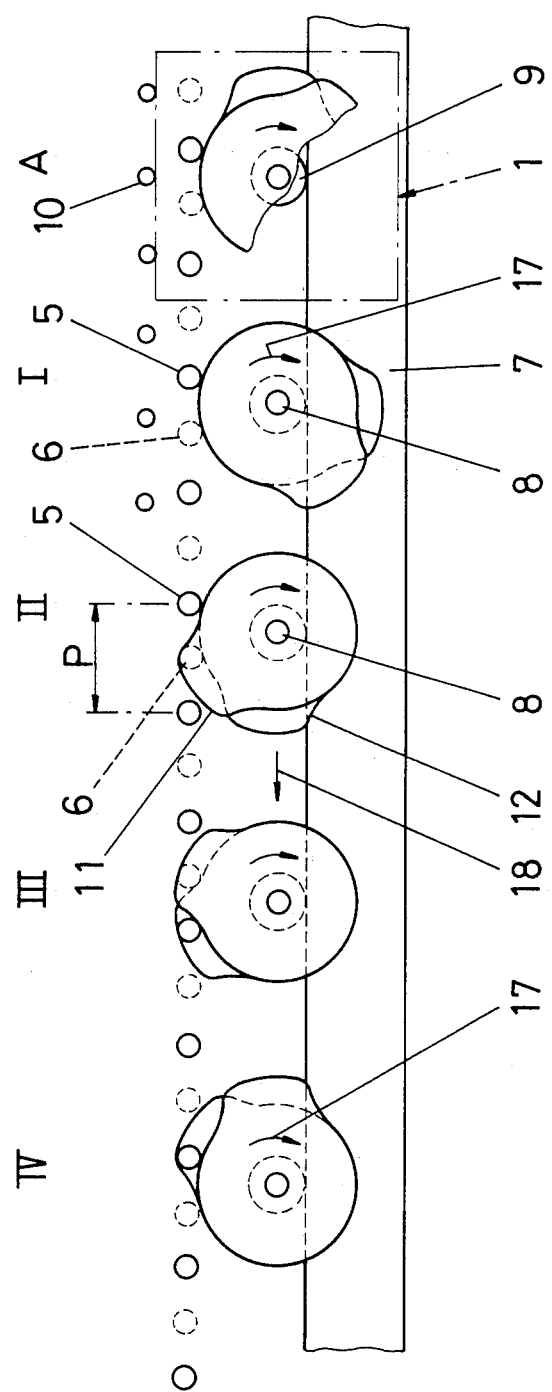
FIG. 2 illustrates how a pallet is controlled during a full revolution of a cam assembly.

FIG. 2 illustrates how the advance and stop operations of a given pallet are controlled by the combined action of the cam assembly and cam followers. The designations of I, II, III and IV given in FIG. 2 represent the four different stages or transitions of a given pallet during one cycle that corresponds to one complete revolution of the cam assembly. At the initial stage represented by the letter "I", the pallet remains at rest or motionless, which signifies the dwell period of the cam assembly. At the second stage "II", the pallet has left the dwell period, and is starting to travel. At the third stage "III", the pallet is placed at the center of the indexing motion of the cam assembly. The final stage of the one cycle of the cam revolution, which is denoted by the letter "IV", represents the end of the indexing motion of the cam assembly, causing the pallet to start to shift to the initial stage, or dwell period, of a next succeeding cycle of another revolution of the cam assembly. The relative positions between a given pallet as represented by dot-dash lines and cam assembly and between the pallet and guide rollers 10 are also illustrated at "A" in FIG. 2.

When the pallet is placed at the initial transition stage "I", it can remain at rest or motionless as the further rotation of the drive shaft 8 in the direction of an arrow 17 has no effect on the behavior of the pallet. The reason is that during the stage "I" that corresponds to the cam dwell period, the round-curve defined portions of the two cam plates 11 and 12 are brought in contact with the corresponding cam followers 5 and 6 facing them, and the roller 9 which is secured to the cam shaft and is in contact with the longitudinal side of the member 7 forces the cam plates 11 and 12 to hold the cam followers.

As the cam assembly is then rotated to the angular position as indicated at the stage "II" in FIG. 2, those portions of the cam plates 11 and 12 which are defined according to the predetermined cam curve diagram are beginning to push the corresponding cam followers 5 and 6 now facing them. Since the cam followers 5 and 6 are fixed in their respective positions along the pallet run way, they cause the pallet 1 to travel in the direction of an arrow 18 away from the stage "II".

The pallet 1 continues to travel until the cam plates are rotated to assume their angular positions relative to the pallet, as shown at the stage "IV" in FIG. 2, when the pallet again enters the dwell period of the cam assembly during which the pallet can remain at rest or motionless.

Both during the dwell period of the cam assembly and during the travelling period of the pallet, the cam plates are always placed under the pressures of any corresponding cam followers 5 and 6 arranged along the run way. Therefore, no vibrations or impacts that may cause noises or mechanical damages can be produced. The pallet can travel or stop with the motion characteristics provided by the cam diagram. As the cam profiles and cam followers are mechanically worked to provide a high precision, the pallet 1 can be stopped with the corresponding high precision, which is provided by the cam assembly during its dwell period.

During the indexing motion of the cam assembly caused by the rotation of the drive shaft 8, the pallet 1 can travel in the direction of the arrow 18 by one pitch (as indicated by "p") which is equal to one indexing motion of the cam assembly. (The cam assembly, as shown in this example, is designed to provide an indexing angle of about 120 degrees, so that the pallet travels forward one pitch (P) during the rotation through 120 degrees of the drive shaft 8 while the pallet remains motionless during the remaining 240 degrees of the shaft rotation.) During the dwell period in which the pallet 1 is motionless, the motor 13 may be stopped. Thus, the pallet stays at the same position until the motor 13 is again started. The above description applies where the stop positions or work stations of the pallets have an interval equal to one pitch. When the interval of those stations is equal to several pitches, however, the length of the time during which the pallet remains at rest at each work station need not be increased. Therefore, the pallet can automatically travel toward a next work station without any attempt to stop the motor 13.

In the embodiment as shown in FIG. 1, individual pallets travel along the run way which is disposed in a horizontal plane. This embodiment may be varied such that the pallets can travel in a vertical plane by mounting the pallet supporting members vertically.

Figure 4:
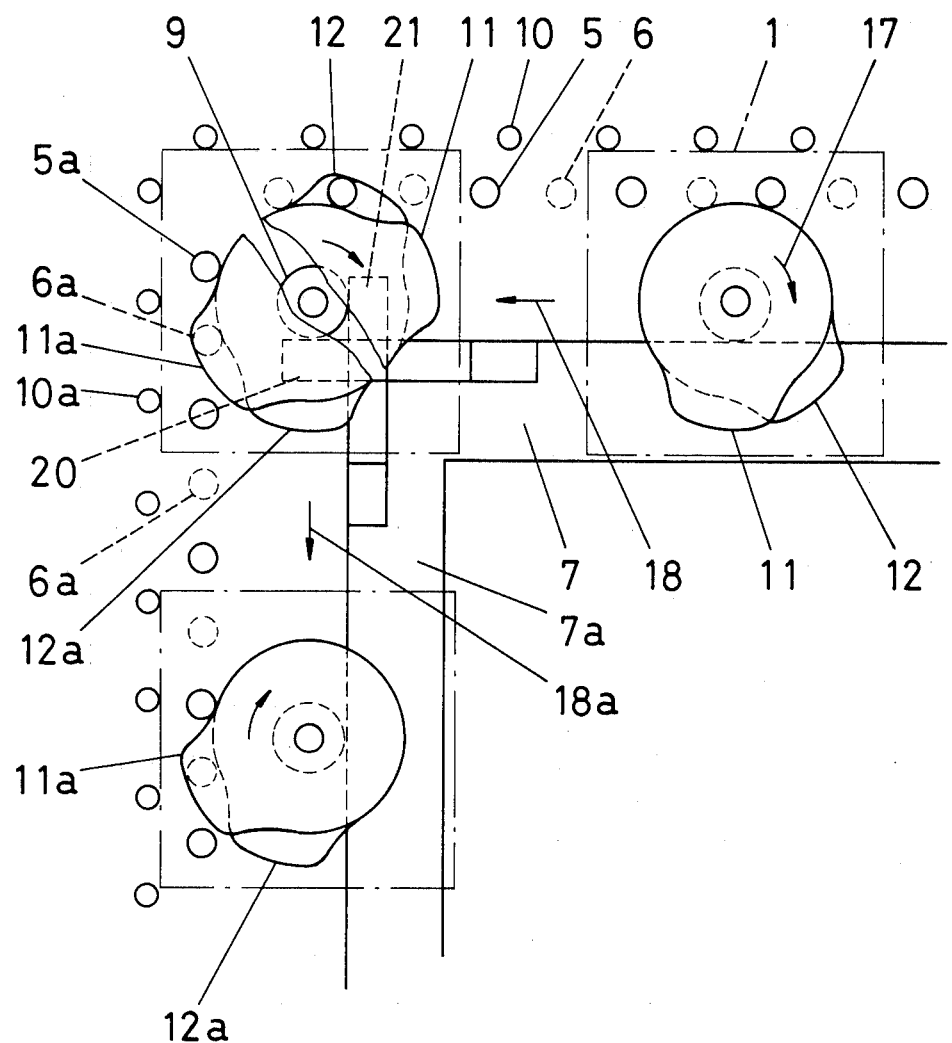
FIG. 4 illustrates how the traveling direction of a pallet is to be changed around a corner of the rectangular track shown in FIG. 3.
Figure 5C:
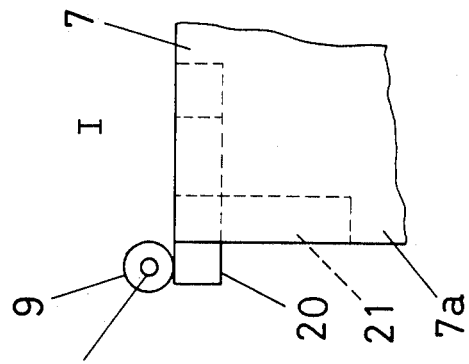
FIGS. 5a, 5b, and 5c illustrate the arrangement of the retractably extensible roller guides in the corners of the rectangular track, showing how the roller guides are operated when a pallet is traveling around a corner.
Figure 5B:
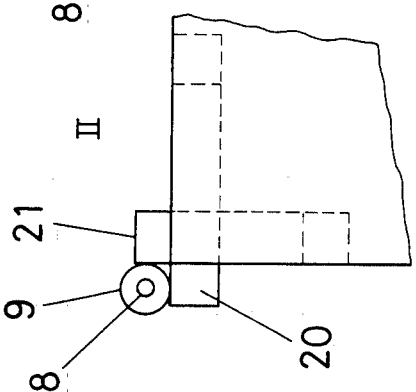
Figure 5A:
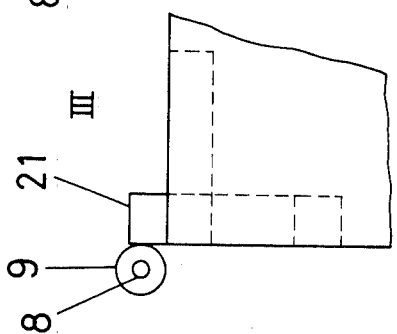

In the embodiment and its variation of the pallet transport apparatus as described above, in which the pallet run way is provided in a rectangular configuration, the pallet can have a change in its traveling direction when it is coming around the corners of the run way. This can be accomplished without any need of equipping each of the individual pallets with any particular means that permits such change in its traveling direction around the corners of the run way. The following description is presented to illustrate the corner arrangement of the run way, which is shown in FIGS. 4 and 5. FIG. 4 shows the details of the corner arrangement of the run way, where a pallet 1 remains motionless around a corner for a moment, and is then being transferred to another passage which is located at a right angle with respect to the preceding passage.

As described earlier by referring to FIGS. 1 through 3, the pallet is traveling toward a corner under control of the motor-driven cam assembly and succeeding cam followers which provide the repeated traveling and stopping motions for the pallet. FIG. 4 illustrates how a change in the traveling direction of the pallet can take place when it has reached a corner.

The corner arrangement includes two passages which intersect at right angles, an extension 7a of the preceding member 7 which is placed at a right angle with respect to the member 7, a pair of cam followers 5a and 6a, and guide rollers 10a, those elements or parts being disposed as shown in FIG. 4. Around the corner of the run way, the first cam follower 5a in the pair is located in a position which is a distance of half a pitch away from the intersecting point where the preceding alignment of the cam followers meets the succeeding alignment of the cam followers at right angles. As clearly seen from FIG. 2, the angular position of the cam plates 11 and 12 around the corner shown in FIG. 4 corresponds to the position at which the cam plates and pallet are entering the dwell period just after the cam indexing motion has completed.

In order to ensure that the pallet 1 can remain motionless during the dwell period and can have a change in its direction around the corner, a separate guide member 20 is provided on the longitudinal side of the member 7 that is contacted by the roller 9 in the pallet. The separate guide member 20 is capable of being extended and retracted. That is, when the pallet is changing its direction from the preceding passage to the next passage which is perpendicular to the preceding passage, the separate guide member 20 is extended beyond the leading edge of the member 7 by a distance of greater than half the radius of the roller 9, as shown at I in FIG. 5. Similarly, a separate guide member 21 is also provided on the member 7a. The function of the separate guide member 21 is the same as that of the separate guide member 20. As such, while the pallet is placed at the corner during the dwell period, the separate guide member 21 is also extended from the leading edge of the member 7a as shown at II in FIG. 5. Then, the separate guide member 20 which is now extended is retracted as shown at III in FIG. 5. Thus, the separate guide member 20 is cleared so that the roller 9 in the pallet can be transferred to the next passage that is perpendicular to the preceding passage.

Referring back to FIG. 4, when the pallet 1 is reaching the corner, it is beginning to have the dwell period provided by the cam assembly in relation to the cam followers 5 and 6. At this stop position, the pallet also has the dwell period provided by the cam assembly in relation to the cam followers 5a and 6a which are located perpendicularly to the preceding cam followers 5 and 6. As further rotation of the drive shaft 8 causes the cam profiled portions of the cam plates as indicated by 11 and 12 in FIG. 4 to rotate to the positions as indicated by 11a, and 12a, the pallet 1 is free from the dwell period and is then driven to travel forward in the direction of an arrow 18a along the passage perpendicular to the preceding passage.

For the cam assembly in the pallet which is located around the corner, as opposed to the cam assembly located on the straight line of the run way, the rotational angle (240°) at which the plate cams 11 and 12 on the straight line are beginning to travel next time in the straight-line direction and the rotational angle (150°) at which the plate cams 11a and 12a are beginning to travel in the direction perpendicular to the preceding passage have a difference of 90°, as clearly seen from FIG. 4. That is, the indexing cam plates as shown in FIGS. 2 and 4 have an indexing angle of 120°, and a dwell angle of 240°. Thus, the dwell angle of the cam plates around the corner is equal to 240°−90°=150°.

When the pallet 1 is placed at the corner as shown in FIG. 4, therefore, it remains motionless during a rotation of the drive shaft 8 through an angle of 150°. While the pallet remains motionless, the separate guide member 21 is projected beyond the leading edge of the member 7a and the separate guide member 20 which is now projected is then withdrawn back toward the member 7. Thus, the change in the traveling direction of the pallet 1 can occur smoothly.

Figure 6:
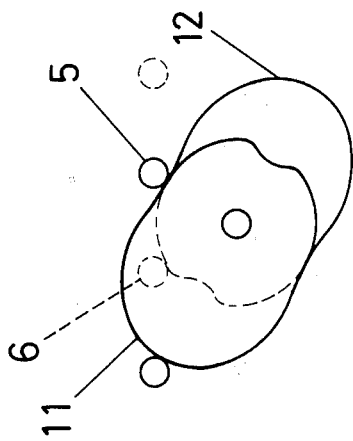
FIG. 6 is a schematic diagram of another embodiment including a half-turn in-line indexing cam assembly.

The construction and operation of the pallet transport apparatus have been described in connection with the specific embodiment and variation thereof, which includes the cam plates that cause the pallet to travel every one pitch (as denoted by "p" in FIG. 2) corresponding to the interval between every second cam follower during one complete revolution of the drive shaft 8. This cam structure may be varied to the form shown in FIG. 6, which is a half-turn type in-line indexing cam structure. The cam structure shown in FIG. 6 is designed to provide an indexing motion which is equal to half length of the pitch provided by the original cam structure shown in FIGS. 2 and 4. In operation, this varied form of the cam structure causes its pallet to travel every half length of pitch during one full revolution of the drive shaft 8.

As readily understood from the foregoing description, the present invention provides a cam-controlled pallet transport apparatus, which presents the advantages over the prior art non-cam employed transport technologies. That is, according to the present invention, the pallet transport apparatus includes individual pallets to travel on a run way, each of the pallets containing its own drive motor and in-line indexing cam mechanism consisting of two plate cams driven by the drive motor shaft. Cam followers are arranged at equally spaced intervals along the run way, each pair of the cam followers to face the two cam plates having an interval equal to half pitch between the adjacent cam followers in the pair so that they can act upon the two plate cams to cause the pallet to travel every one pitch equal to the interval between every second cam followers. Thus, each pallet can travel and remain motionless under control of its cam plates and corresponding cam followers facing them. The traveling and stopping operation of the pallet is thus repeated, and can occur smoothly and reliably. The high-speed revolution of the motor-driven cam shaft causes the pallet to travel at a high speed between the work stations. The traveling speed of each pallet is controlled by the cam curve diagram specifically designed to produce no noises or vibrations due to any possible impacts that may otherwise occur. Therefore, the traveling and stopping operations of the pallet can occur silently.

Every adjacent work station or stop station along the pallet run way may have an interval equal to 1000 mm, and every second cam follower may have one pitch equal to an interval of 100 mm. In this case, a pallet travels and is then stopped between the adjacent work stations, the traveling and stopping operations being repeated ten times during a short period of time. As a result, this means that the pallet can travel at a high speed from one work station to another. As previously described, the pallet is stopped every one pitch that correspond to the interval between every second cam followers arranged in position along the run way. Thus, the dwell periods provided by the cam assembly may correspond to work stations. That is, when the cam assembly has a given dwell period and is then stopped for a moment by powering off the drive motor, the position that corresponds to that dwell period will serve as a work station. In this manner, work stations can be provided at different locations along the run way. The choice of those locations can be made to meet the particular assembly or other work needs. When an interval between the locations chosen as work stations is great, it is necessary to reduce the time required to cause one pallet to travel from one work station to another. In this case, another succeeding pallet must be waiting immediately after the station that the preceding pallet has left. However, no collision between the two adjacent pallets occurs as opposed to the case with the conventional free-flow pallet transport system.

For a pallet having a size equal to several pitches for the cam followers, a single pallet can carry different tools or fixtures that are placed every one pitch, since the pallet is stopped every one pitch. Thus, different works corresponding to the number of the tools on the pallet can be carried out at the same work station.

Figure 3:
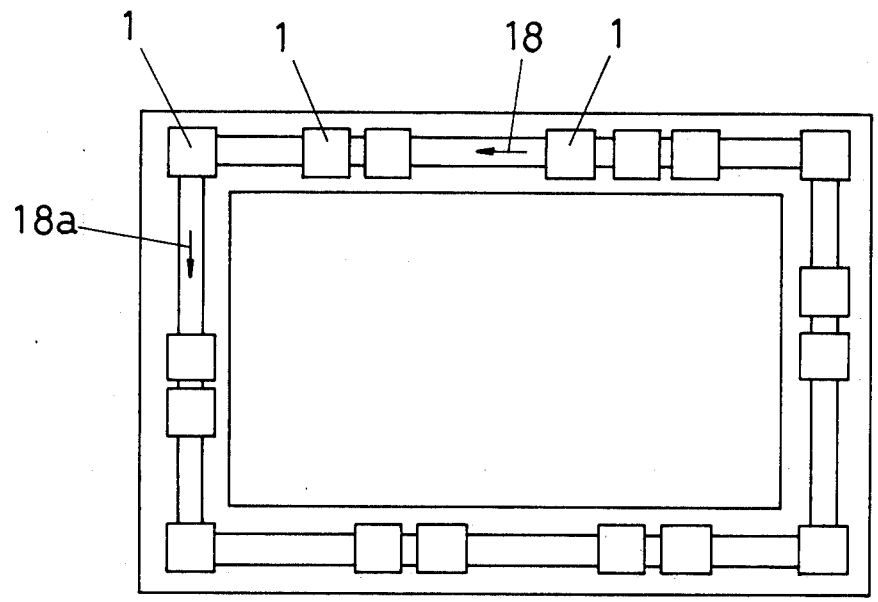
FIG. 3 illustrates an endless, rectangular-shaped pallet transport passage on which pallets travel in succession.

When the pallet run way is provided in the form of a rectangular track as shown in FIG. 3, any stop positions along the rectangular track may be chosen as work stations. In addition, a change in the traveling direction of a pallet around the corners of the rectangular track can easily take place as each corner is configured to permit such change without any provision of the direction change mechanism on each of the individual pallets.

Although the present invention has been described with reference to the several preferred embodiments thereof, it should be understood that various changes and modifications may be made without departing from the spirit and scope of the invention.

What is claimed is:

1. A cam-controlled pallet transport apparatus which comprises:
   individual box-type pallets each containing in-line indexing cam means consisting of one upper plate cam and one lower plate cam and a drive motor for driving said in-line indexing cam means; and
   a pallet running way on which said pallets travel, including cam follower pairs each arranged at equally spaced intervals along said pallet running way, whereby said in-line indexing cam means and corresponding cam followers facing said cam means control the pallet so that it can travel and be stopped every one pitch as determined by the intervals between the cam follower pairs.

2. A cam-controlled pallet transport apparatus as defined in claim 1, wherein said pallet running way comprises support members for supporting the bottom of the pallets and guide members for supporting the sides of the pallets, said support members and guide members extending longitudinally along the running way.

3. A cam-controlled pallet transport apparatus as defined in claim 2, wherein said pallet support members include rollers arranged in a horizontal disposition.

4. A cam-controlled pallet transport apparatus as defined in claim 2, wherein said guide members include guide rollers rotatably mounted to vertical shafts extending along the run way.

5. A cam-controlled pallet transport apparatus as defined in claim 1, wherein each said cam follower pair includes two rollers, one facing the upper plate cam of said cam means and the other facing the lower plate cam, the cam follower pairs being arranged such that those cam follower rollers to face the upper plate cam are aligned at equally-spaced relationships along the running way and those cam follower rollers to face the lower plate cam are aligned at equally-spaced relationships along the running way.

6. A cam-controlled pallet transport apparatus as defined in claim 1, wherein the longitudinal side of the box-type pallet is long enough to cover at least two pitches as determined by the interval between the upper or lower cam follower rollers.

* * * * *